May 15, 1928.
H. COFFER
1,669,899
SPOKE TIGHTENER
Filed Feb. 19, 1927
2 Sheets-Sheet 1
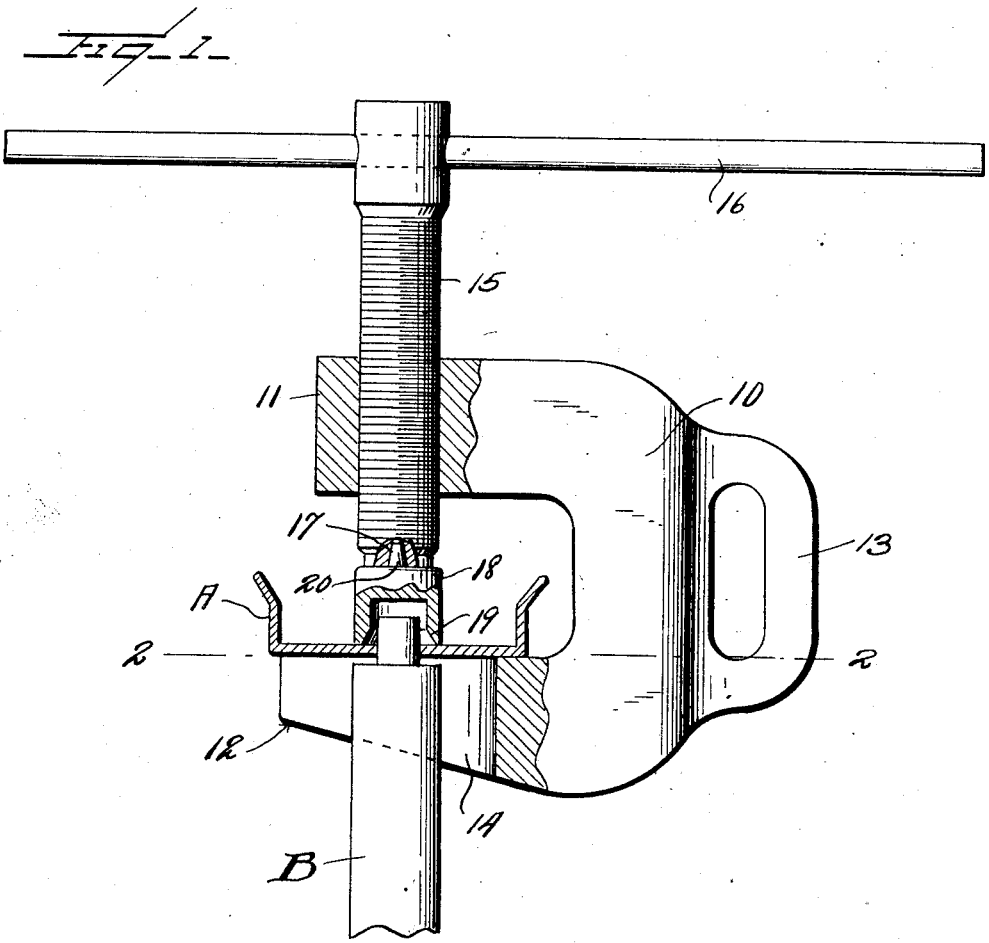
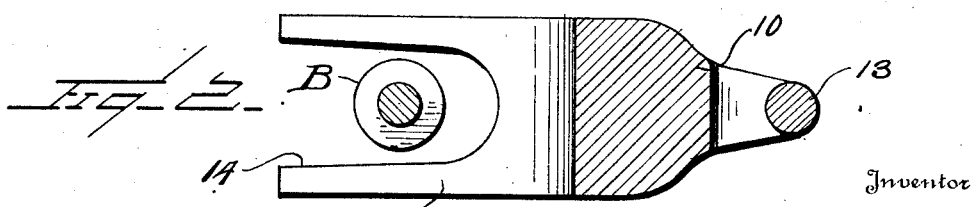
Inventor
H. Coffer
By Watson E. Coleman
Attorney May 15, 1928.
H. COFFER
SPOKE TIGHTENER
Filed Feb. 19, 1927
1,669,899
2 Sheets-Sheet 2
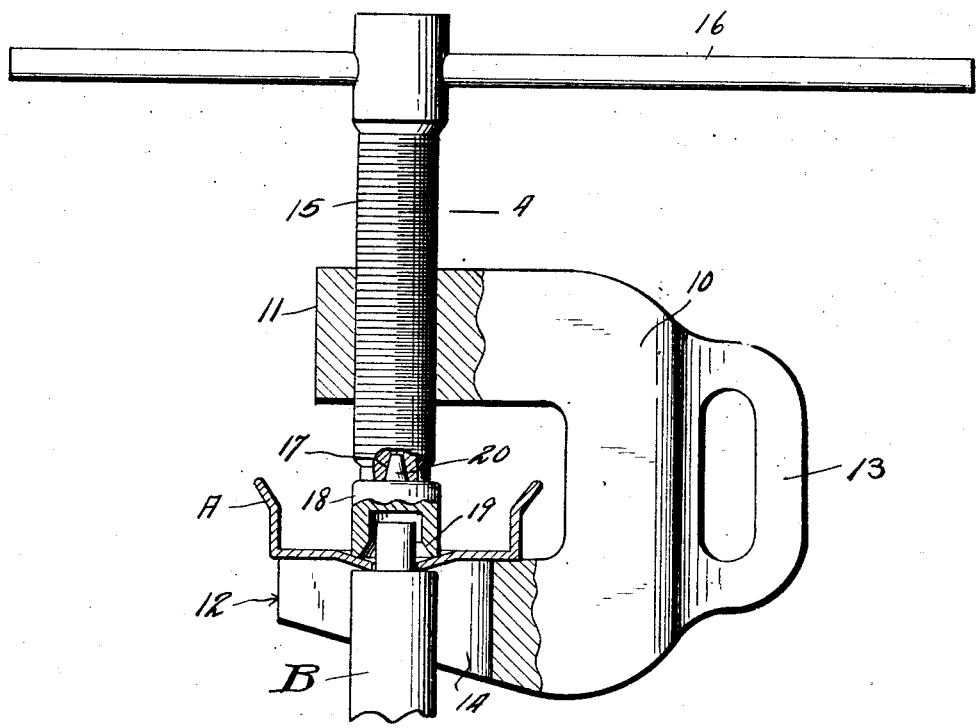
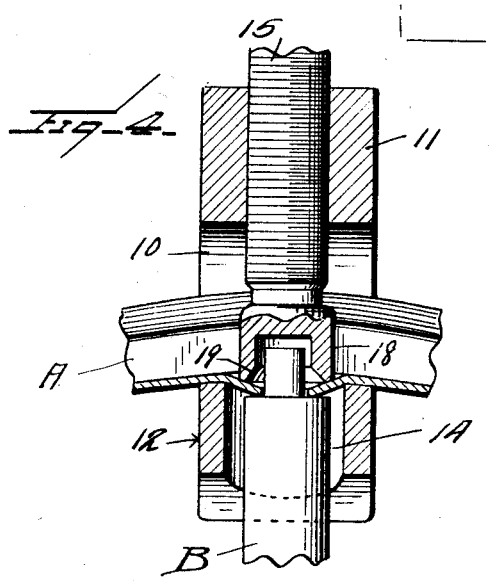
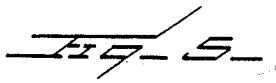
Inventor
H. Coffer
By Watson E. Coleman
Attorney Patented May 15, 1928.

1,669,899

UNITED STATES PATENT OFFICE.

HARRY COFFER, OF SANDPOINT, IDAHO.

SPOKE TIGHTENER.

Application filed February 19, 1927. Serial No. 169,627.

This invention relates to devices for tightening the spokes of automobile wheels and wheels of like nature.

The general object of the invention is to provide means which may be engaged over a wheel rim against the back thereof and around the spoke and which is provided with a screw-threaded plunger, as it may be termed, adapted to bear against the metal of a rim or felly immediately around the end of the spoke and force this portion of the felly or rim inward against the shoulder of the spoke inward against the hub.

A further object is to provide a device of this character which is very simple, which may be readily applied, and which is light and easy to operate.

My invention is illustrated in the accompanying drawings wherein:—

Figure 1 is an elevation of my device partly in section;

Fig. 2 is a section on the line 2—2 of Figure 1;

Fig. 3 is a like view to Figure 1 but showing the die or head forced downward;

Fig. 4 is a fragmentary section on the line 4—4 of Figure 3;

Fig. 5 is a sectional view of the die or head.

Referring to these drawings it will be seen that my spoke tightener comprises an approximately U-shaped frame 10 having an upper jaw 11, a lower jaw 12, and preferably being formed to provide a handle projecting from or formed in the bight portion of the frame. As illustrated, the bight portion of the frame is "finned out" and the hand hold 13 cut out of the edge of the finned out portion.

Passing through the screw-threaded bore of the jaw 11 is a screw 15 having the handle 16 whereby it may be rotated. The lower end of this screw is formed with a recess 17 and adapted to be engaged by the lower end of the screw is a removable head or cap 18 formed to fit the upper end of a spoke and against the felly of the wheel. This member 18 may be rectangular or circular in plan and its side walls are preferably beveled, as at 19. The upper face of this cap 18 is provided with the upwardly extending lug 20 adapted to be received in the recess 17.

In the use of this device, the frame 10 is disposed over the rim or felly A of a wheel with the bifurcated jaw 12 embracing the spoke B inward of the felly. The screw 15 is then turned to force the cap 18 down against the felly all around the spoke and when pressure has been applied the felly will be forced downward or inward against the shoulder of the spoke and the spoke thus tightened relative to the felly and continued pressure will force the spoke inward or toward the hub of the wheel.

It will be seen that this device is very simple and may be readily applied and it has been found thoroughly effective for the purpose intended. It will be understood that caps 18 of various sizes will be provided for different sizes of wheels.

I claim:—

1. A spoke tightener comprising an approximately U-shaped frame formed to provide an upper jaw and a lower jaw, the lower jaw being longitudinally slotted to permit the jaw to embrace a spoke inward of the rim of the wheel, a screw-threaded plunger passing through the upper jaw and having a handle whereby it may be rotated, and a detachable hollow cap mounted upon the lower end of the plunger and adapted to engage the rim of a wheel around the spoke thereof, the cap having a centrally disposed lug and the plunger having a recess to receive the lug.

2. A spoke tightener of the character described including an approximately U-shaped frame formed to provide a body portion, an upper jaw and a lower jaw, the body portion being provided with a handle extending at right angles to the jaws, the lower jaw being slotted to permit it to embrace a spoke inward of the rim of the wheel, a plunger passing through the upper jaw and having screw-threaded engagement therewith and having a handle whereby it may be rotated, and a hollow cap detachably mounted upon the lower end of the plunger and adapted to engage the rim of a wheel around the spoke thereof, the cap constituting a die and the lower edge of the cap being beveled downward and outward.

In testimony whereof I hereunto affix my signature.

HARRY COFFER.